United States Patent [19]

Arns et al.

[11] 4,456,328

[45] Jun. 26, 1984

[54] SYSTEMS FOR FORMING IMPROVED DIFFUSION HOLOGRAMS

[75] Inventors: James A. Arns, Culver City; Timothy J. Edwards, Hermosa Beach; Gaylord E. Moss, Marina del Rey; John E. Wreede, Monrovia, all of Calif.

[73] Assignee: Hughes Aircraft Company, El Segundo, Calif.

[21] Appl. No.: 269,105

[22] Filed: Jun. 1, 1981

[51] Int. Cl.³ .............................................. G03H 1/02
[52] U.S. Cl. ..................................................... 350/3.6
[58] Field of Search ...................... 350/3.6, 3.65, 3.67, 350/3.83

[56] References Cited

U.S. PATENT DOCUMENTS

| | | | |
|---|---|---|---|
| 3,494,698 | 2/1970 | Neumann | 350/3.67 |
| 3,572,882 | 3/1971 | Neumann | 350/3.67 |
| 3,632,182 | 1/1972 | Sincerbox | 350/3.67 |
| 3,635,539 | 1/1972 | McMahon | 350/3.67 |
| 3,659,947 | 5/1972 | Neumann | 350/3.67 |
| 3,666,344 | 5/1972 | Mottier | 350/3.67 |
| 3,762,215 | 10/1973 | Aleksoff | 350/3.67 |

OTHER PUBLICATIONS

*Acoustical Holography*, vol. 5, pp. 41–45, Ed. P. S. Green (Plenum Press).
*Optical Holography*, pp. 418–425, 437–438, Collier et al., (Academic Press 1971).
*Laser Applications*, vol. 1, pp. 42–49, Ed. M. Ross (Academic Press 1971).

*Primary Examiner*—Bruce Y. Arnold
*Attorney, Agent, or Firm*—Craig B. Bailey; A. W. Karambelas

[57] ABSTRACT

The hologram forming systems of the invention form diffusion type holograms in which undesired spurious transmission hologram recordings are eliminated. The reflecting surfaces are moved during the recording process so that the reflected rays change in phase relative to the primary recording beams and spurious holograms cannot be recorded with sufficient intensity to form undesired reflections in the developed hologram. Thus, pictorial type holograms such as jewelry holograms or art holograms do not present undesired ghost images or flare patterns to the viewer. The concepts of the invention also include formation of diffusion type holograms for high gain directional viewing screens.

14 Claims, 10 Drawing Figures

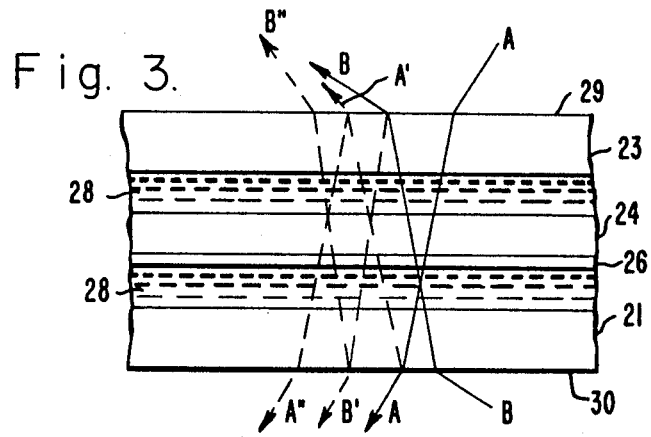
Fig. 3.
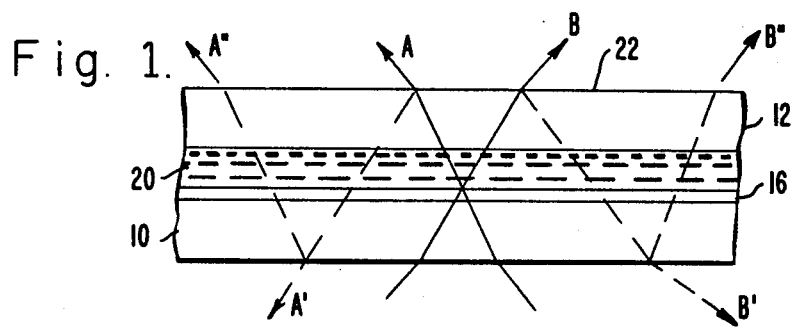
Fig. 1.
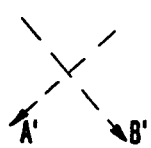
TRANSMISSION
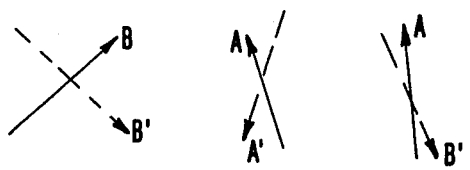
Fig. 2. REFLECTION
TRANSMISSION
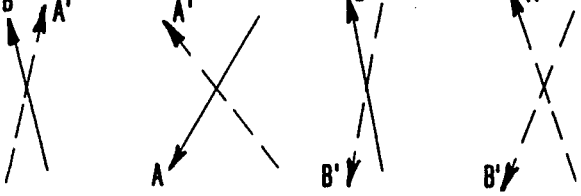
Fig. 4. REFLECTION

SYSTEMS FOR FORMING IMPROVED DIFFUSION HOLOGRAMS

TECHNICAL FIELD

This invention relates to a system and method of forming improved holograms and particularly to a system and method that forms diffusion holograms in which spurious hologram recordings are eliminated.

CROSS REFERENCE TO RELATED APPLICATIONS

This application is related to a U.S. patent application No. 269,104 entitled, "DOUBLE BEAM SYSTEMS FOR FORMING IMPROVED HOLOGRAMS" by James A. Arns, Timothy J. Edwards, Gaylord E. Moss, and John E. Wreede; and U.S. patent application No. 269,104 entitled "SYSTEMS FOR FORMING IMPROVED REFLECTION HOLOGRAMS WITH A SINGLE BEAM" by James A. Arns, Timothy J. Edwards, Gaylord E. Moss, and John E. Wreede, both referenced applications being filed concurrently with this application.

BACKGROUND OF THE INVENTION

1. Field of the Invention

One of the problems associated with holograms is that diffusion type holograms which provide holographic pictures of objects, for example, are degraded by the effects of the spurious reflection and transmission hologram recordings that are generated during the holographic exposure process. These spurious holograms have been found to be generated by reflections from surfaces which are interfaces of materials of differing index of refraction such as air to glass interfaces of the transparent surfaces of the recording cover plates, the substrate, the gelatin, the recording medium or the optical elements. These reflections combine with the main holographic beams and with each other to form both spurious reflection hologram recordings and spurious transmission hologram recordings on the recording film. In a hologram display, the spurious reflection hologram recordings create ghost images and the spurious transmission hologram recordings create rainbow-like flare patterns. The purpose of this invention is to prevent the recording of the unwanted spurious holograms that are caused by reflections and thus to eliminate both ghost and flare images in the final hologram recording. Diffusion holograms are used to form data holograms, directional projection screens (either front or rear projection screens), jewelry holograms, art holograms and other pictorial holograms, all of which conventionally have undesired characteristics caused by the presence of spurious hologram recordings.

2. Description of the Prior Art

Prior to this invention there was no known method to reduce flare and ghost images of diffusion type holograms to acceptable levels. The basic approaches that have been utilized in an attempt to minimize the problem are to anti-reflection coat all reflection surfaces of the hologram forming system, to embed all optical elements in an index matching fluid when forming the hologram such that no interface reflections reach the hologram area, or to form the hologram with the beams impinging the film supporting elements at the Brewster angle. The first method has been found to be inadequate because the best known anti-reflection coating provides results that are much worse than required. The second method is generally unsuccessful because the striations in large fluid volumes degrade the holographic recording process. The third method is unsatisfactory because of the restriction of the angular placement of the recording, and hence playback, beams to the recording medium.

SUMMARY OF THE INVENTION

It is therefore an advantage of the invention to provide diffuse holograms in which undesired spurious holographic recordings are eliminated.

It is a further advantage of the invention to provide a diffuse type display hologram in which ghost images and rainbow-like flare patterns are eliminated.

It is another advantage of the invention to provide improved diffusion type transmission holograms.

It is still another advantage of the invention to provide improved diffusion type reflection holograms.

The systems in accordance with the invention provide diffusion type transmission and reflection holograms in which spurious hologram recordings are eliminated by changing the phase of the reflected rays relative to the phase of the rays in the primary beams. A first beam is applied to an object being recorded from which rays are reflected or transmitted diffusely to the recording structure as the first primary recording beam. A second beam is applied directly to the recording structure as the secondary primary recording beam. In the transmission hologram forming system, one or both of the cover plates of the recording structure is moved to change the phase of the reflected rays from that cover relative to the phase of the primary rays at the recording medium. In the reflective hologram forming system, both cover plates of the recording structure move to change the phase of the reflected rays from the covers and the first and second primary recording beams are passed through global phase shifters prior to the recording structure so that the phases of the primary beams are compensated for the cover plate movement. A source that controls the movement of the cover plates also controls the movement of one surface of the first global phase shifter. A sensing system controls the movement of one surface of the second global phase shifter in response to relative phase changes between the two primary beams (due to cover plate movement) at the recording medium so that the efficiency of the primary hologram is maintained at a high level and is not effected by the operation eliminating the spurious hologram recordings.

BRIEF DESCRIPTION OF THE DRAWINGS

The novel features that are considered characteristic of this invention are set forth with particularity in the appended claims. The invention itself, both as to its organization and method of operation, as well as additional objects and advantages thereof, will best be understood from the following description when read in connection with the accompanying drawings in which like reference numbers refer to like parts and in which:

FIG. 1 is a schematic fragmentary side view of a portion of a diffusion type transmission hologram forming structure for explaining the reflective beams or rays that are present to form undesired spurious hologram recordings;

FIG. 2 is a schematic diagram showing the principle rays in the structure of FIG. 1 that form spurious transmission and reflection holograms in the concepts of the invention;

FIG. 3 is a schematic fragmentary side view of a portion of a diffusion type reflection hologram forming structure for explaining the reflective beams or rays that are present to form spurious hologram recordings;

FIG. 4 is a schematic diagram showing the principle rays in the structure of FIG. 3 that form spurious transmission and reflection holograms in the concepts of the invention;

DETAILED DESCRIPTION OF THE INVENTION

Figure 5:
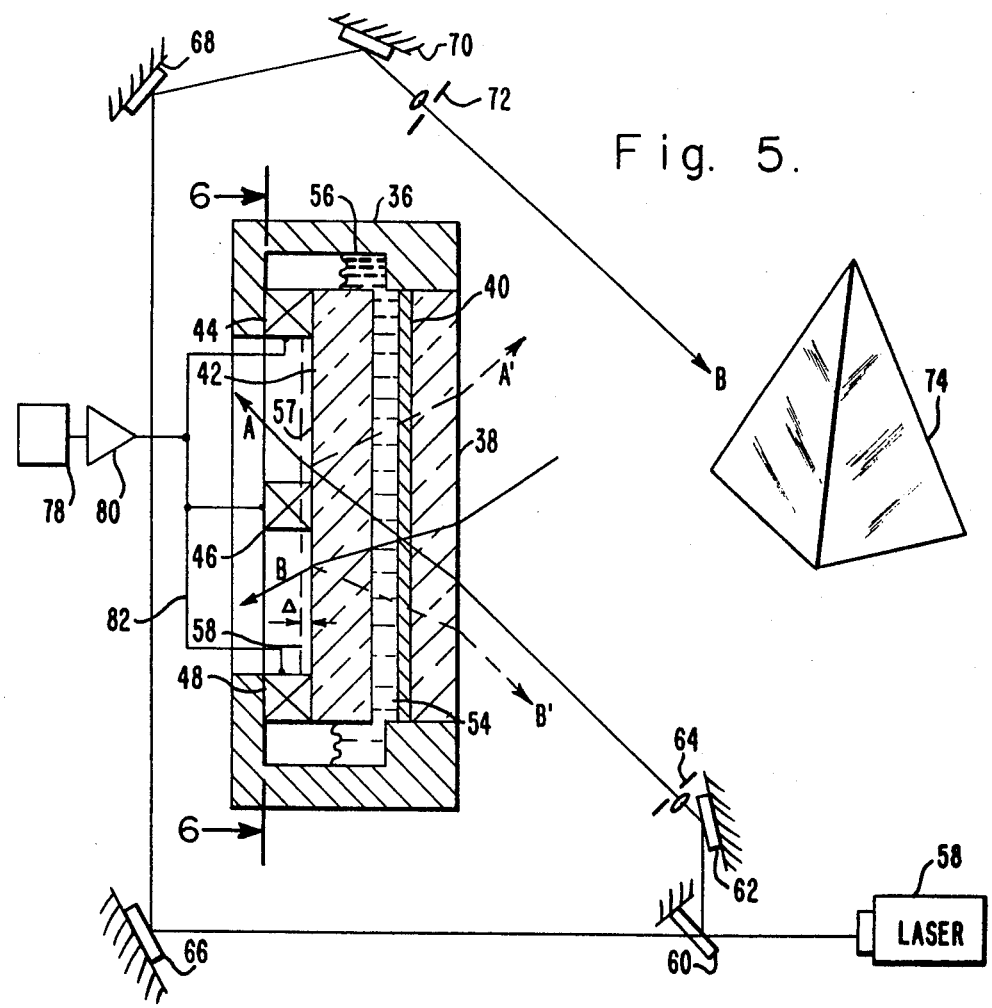
FIG. 5 is a schematic sectional view showing a system in accordance with the principles of the invention, for forming a diffusion type transmission hologram with one reflective surface of the hologram recording optics being controlled to move so as to prevent formation of all spurious recordings that are formed from rays combined with a primary beam and spurious recordings that are formed from rays which are not of the same order of reflection.

Referring first to FIG. 1 which shows a sideview of a structure similar to that utilized to provide display holograms in accordance with the invention but having reflective surfaces typical of prior art structures, the spurious hologram recording problem will be explained. The recording structure for forming a transmission hologram includes first and second cover plates 10 and 12 shown flat for convenience of illustration but which may be curved as is well known in the art. A recording medium 16 is fixed or deposited on the cover plate 10, which medium may be any suitable recording material such as dichromated gelatin having a known sensitivity. The recording medium 16 may be a phase type holographic material such as dichromated gelatin or an amplitude type material such as silver halide. The space between the cover plates 10 and 12 is filled with a suitable refractive index matching fluid 20 so that the laser rays are not reflected from the inner surface of the cover plate 12 or from the interface surface of the recording medium 16 and the index matching fluid 20. Thus, in the recording structures used in the invention, only the outer surfaces provide substantial reflection because the other surfaces are index matched. Primary rays A and B of a laser beam are applied to the structure and first order reflections A' and B' result at a surface 22 of the cover plate 12. Higher order reflections such as rays A" and B" are also present but their intensity is at relatively low level.

Referring now also to FIG. 2, spurious reflection holograms from rays BB', AA', AB', and A'B will be formed at the recording medium 16 as a result of the surface reflections shown in FIG. 1. A spurious transmission hologram from rays A'B' is also formed from the reflections of FIG. 1. Other spurious holograms of the transmission and reflection types are also formed from second order reflection rays such as A" and B" and from higher order rays. The transmission hologram forming system of FIG. 5 prevents formation of all spurious holograms from rays shown in FIG. 2 and from combinations of rays in which one ray is either primary ray A or B.

Figure 7:
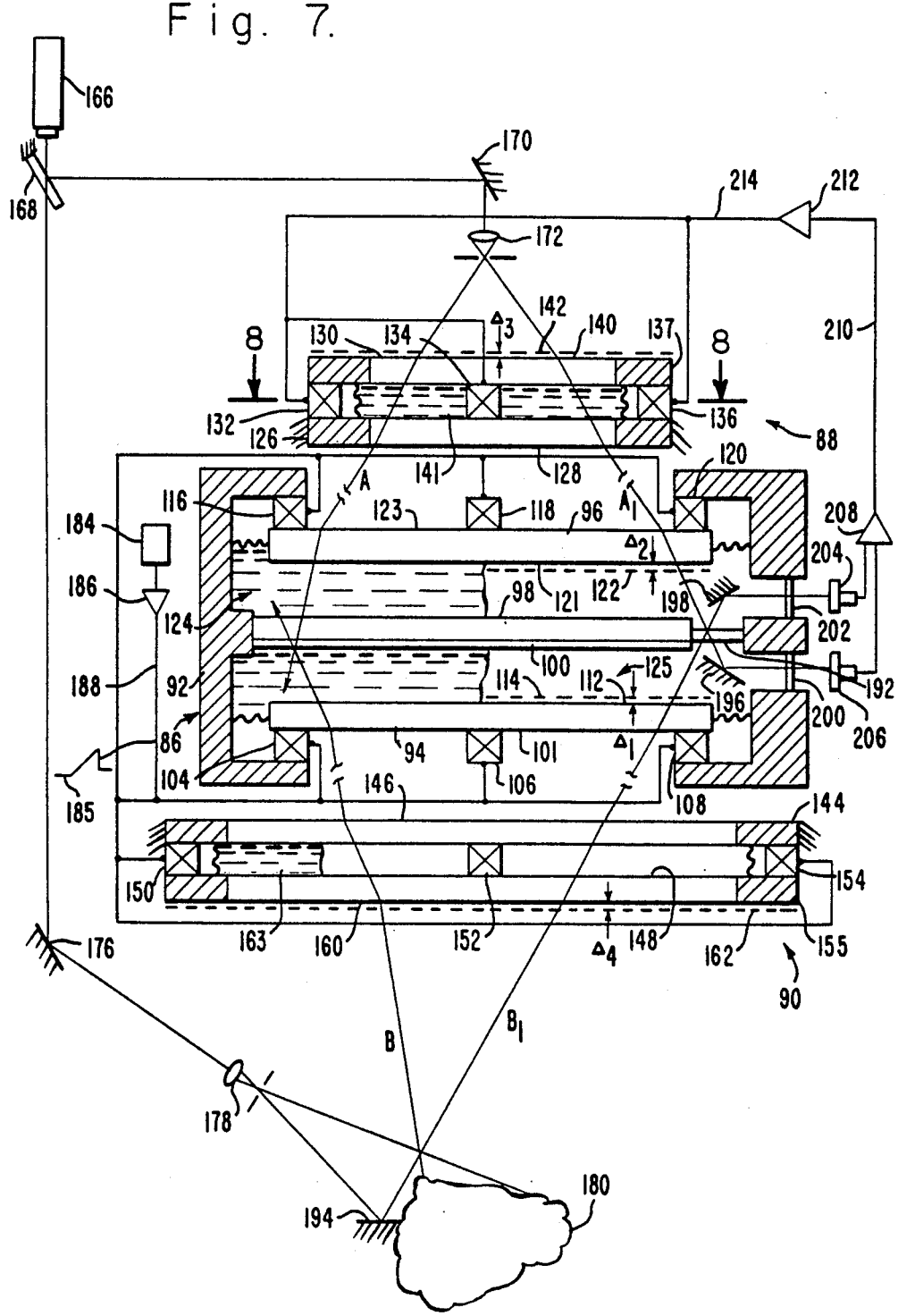
FIG. 7 is a schematic sectional view showing a system for forming a diffusion type reflection hologram with all of the reflective surfaces of the recording structure moving and including controlled global phase shifters, all in accordance with the principles of the invention.

Referring now to the side view of FIG. 3, a hologram forming structure is shown which is similar to the recording structure of FIG. 7 with the beams directed to form a reflection hologram. The structure includes cover plates 21 and 23 positioned on both sides of a substrate 24 having a recording medium 26 on a surface thereof. An index matching fluid 28 is retained between the cover plate 23 and the substrate 24 and between the recording medium 26 and the cover plate 21 so that only the outer surfaces reflect rays. The beams A and B are applied to the structure from opposite directions and beam A' is reflected from a surface 30 with beam B' being reflected from a surface 29. Also present are higher order reflections such as A" and B". The desired hologram in the systems of the invention is the hologram formed by interference between primary rays A and B.

Referring now also to FIG. 4, the spurious transmission holograms provided by the structure of FIG. 3 are formed by interference between rays AB' and A'B. Other relatively weak spurious transmission holograms are formed from ray combinations A'B", B'A", A"A and B"B. The spurious reflection holograms formed by the same structure are formed from rays AA', BB' and A'B', the holograms from the latter second order rays being relatively weak in comparison to the former second order cases. Other spurious reflection hologram recordings that are relatively weak are formed from rays AB", BA" and A"B". It is to be noted that spurious holograms resulting from all ray combinations are eliminated by the system of FIG. 7 having two moving cover plates.

Figure 6:
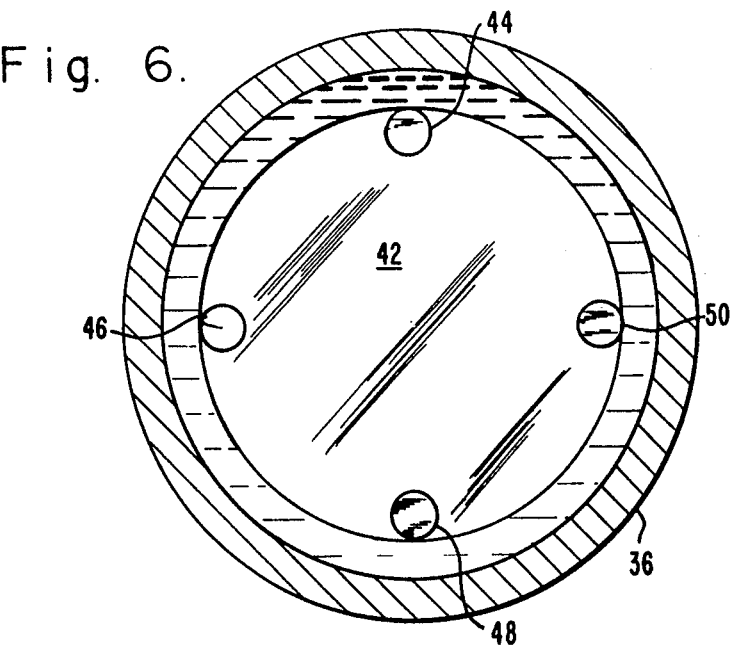
FIG. 6 is a sectional view taken at lines 6—6 of FIG. 5 for further explaining the recording structure in accordance with the principles of the invention.

Referring now to FIGS. 5 and 6, the transmission hologram forming system includes a mounting structure 36 having a cover plate 38 positioned at one end thereof with a recording medium 40 attached or deposited thereon. The recording medium 40 may be any suitable phase type recording material such as a dichromated gelatin or any suitable amplitude type recording material such as silver halide. Adjacent to the recording medium 40 is a cover plate 42 attached or glued to transducers such as piezoelectric cylinders 44, 46, 48 and 50 as can be seen in FIG. 6. The four piezoelectric cylinders have their other end fixedly mounted by methods such as glue to the mounting structure 36. A refractive index matching fluid 54 fills the space between the cover plate 42 and the recording medium 40. The fluid is retained by sealing bellows 56. Movement Δ of a surface 57 of the the cover plate 42 is provided as indicated by a dashed surface 58. It is to be noted that although the movement is illustrated as being provided by piezoelectric cylinders, any suitable type of movement control or transducer arrangement may be utilized such as piezoelectric stacks, motor driven micrometers, thermal means, electromagnetic transducers, or manual operation with an associated control movement device, all within the scope of the invention. Also, the cover plate 42 can be mounted in a loose manner in order to allow incidental movement, with the entire system being caused or allowed to vibrate providing a differential movement between the cover plate and all other elements of the system.

The hologram is formed by energy from a laser 58 which applies a beam to a beam splitter 60, which may be a 50-50 reflective-transmittive mirror, with a beam being reflected to a mirror 62. The beam is then applied to a suitable beam shaping structure such as a spatial filter 64 where it is subsequently applied to the cover plate 38 as a primary hologram forming beam indicated as a ray A. It is to be understood that both laser beam path lengths are matched in the system of FIG. 5, as well as in the system of FIG. 7, within the restrictions of the coherence length of the laser source. The spatial filter 64 may be a lens and a plate with a hole of a selected size as is well known in the art. The beam may be shaped to have a spherical phase front or a phase front of any desired shape by suitable optics (not shown) positioned between the beam splitter 60 and the cover plate 38. The laser beam transmitted through the beam splitter 60 is sequentially reflected from mirrors 66, 68 and 70 and passed through a suitable beam shaping structure such as a spatial filter 72. The beam is passed from the spatial filter 72 to an object 74 which is to be recorded on the hologram. The beam may be shaped to have a spherical phase front or a phase front of any desired shape by suitable optics (not shown) positioned between the beam splitter 60 and the object. The beam is reflected from the object 74 as a diffuse beam and applied to the cover plate 38 as indicated by a ray B. Thus, the second primary hologram forming beam is a diffused beam enabling a viewer to see light corresponding to all elements of the recording objects image from any one position of the hologram.

Movement of the cover plate 42 during the recording period is provided by a waveform generator 78 applying a ramp voltage, for example, through a high voltage amplifier 80 to a lead 82. The ramp voltage is applied to the piezoelectric cylinders 44, 46, 48 and 50 so that the surface 57 of the cover plate 42 moves the distance $\Delta$ one or more times, for example, during the recording period. The phase shift of the reflected beams A' and B' may be over a portion of the wavelength or one or more wavelengths of the laser beam during the recording period. The wavelength of the laser 58 may be of any suitable selected value such as between a fraction of a micron and 10.6 microns, for example. It is to be understood that the principles of the invention are not limited to any particular frequency but include any suitable frequency and includes all electromagnetic radiation frequencies and acoustic frequencies.

In operation, the diffusion hologram may be formed over a period that is a function of the sensitivity of the recording medium 40 which may result in an exposure time between nanoseconds and hours, for example. The movement of the surface 57 during the recording period prevents the spurious holograms from being recorded as the phase between the reflected first and higher order rays changes with respect to the primary rays at the position of the recording medium. This motion can be continuous motion or step motion. The phase of the primary beams remains constant at the recording medium and they experience no relative changing phases since they transverse no moving surfaces prior to the recording medium. The principal spurious holograms are not recorded as the reflected recording phases move relative to the primary recording phases at the recording medium 40 causing blurring of any interference fringes. In a phase type recording medium, the systems of the invention only cause a slight decrease in the available index of modulation of the recording medium and in an amplitude type recording medium the systems of the invention only cause a slight darkening of the recording medium. However, these effects are present to the same extent when the spurious holograms are allowed to form. The extent of this hardening or index modulation loss is no more than the average value when the concepts of the invention are not utilized. Therefore, the primary hologram is just as efficient as if the concepts of the invention were not used. There is a slight loss in efficiency when compared to the case of theoretically perfect anti-reflection coatings with no reflections occurring. As previously discussed, the system of FIG. 5 prevents all spurious holograms from being recorded from all combinations of rays of which one of the rays is either the primary ray A or B. At the same time, the primary recording is not decreased in intensity as a result of the moving cover plate.

Figure 8:
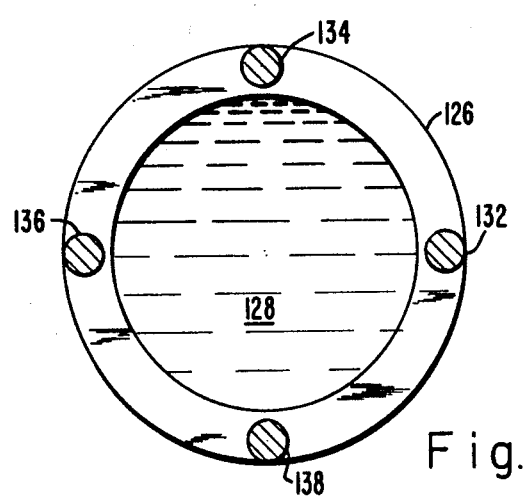
FIG. 8 is a schematic sectional side view taken at lines 8—8 of FIG. 7 of further explaining the structure of the global phase shifter.

Referring now to FIGS. 7 and 8 showing a system which forms a diffusion type reflection hologram, a recording structure 86 and phase shifters 88 and 90 are provided to prevent the formation of all spurious hologram recordings including those from all combinations of higher order reflections. The phase shifters 88 and 90 are shown near to the recording structure 86 for convenience of illustration, but it is to be understood that the phase shifters 88 and 90 are at a distance from the recording structure, off the vertical axis of the recording structure or both to minimize relections therefrom. The recording structure 86 includes a mounting structure 92 and glass cover plates 94 and 96 movably positioned therein. A substrate 98 is fixedly mounted to the structure 92 between the cover plates 94 and 96 and has a recording medium 100 attached or deposited on one flat side thereof. The recording medium 100 may be any suitable recording material such as dichromated gelatin which is a phase type recording medium or may be an amplitude type recording medium such as silver halide. Fixedly attached at first ends to the cover plate 94 are four transducers such as piezoelectric cylinders including three cylinders 104, 106 and 108 as shown and one other cylinder (not shown). The four piezoelectric cylinders including cylinders 104, 106 and 108 are mounted at second ends to the mounting structure 92 so as to be controlled to move a surface 112 a distance $\Delta_1$ to the position of a dotted line 114 one or more times, for example, during the recording period. Mounted to the cover plate 96 at first ends thereof are four transducers such as piezoelectric cylinders, three cylinders 116, 118 and 120 being shown. The four cylinders mounted on each of the cover plates 96 and 94 may be positioned similar to those shown in FIG. 6. The second ends of the piezoelectric cylinders including the cylinders 116, 118 and 120 are mounted to the mounting structure 92 so that a surface 121 of the cover plate 96 can be controlled to move a distance $\Delta_2$ to a dotted surface 122 one or more times, for example, during a recording period. Index matching fluids 124 and 125 are retained between the cover plate 94 and the recording medium 100 and between the substrate 98 and the cover plate 96.

The phase shifter 88 includes a mounting structure 126 to which a glass window 128 is fixedly mounted and includes a window 130 mounted in a suitable mounting ring 137 to which first ends of four transducers such as piezoelectric cylinders 132, 134, 136 and 138 (as shown in FIG. 8) are attached or glued thereto. The four piezoelectric cylinders have second ends attached to the mounting structure 126 so that a surface 140 of the window 130 moves a distance $\Delta_3$ to the position of a dotted line 142 one or more times, for example, during the recording period. An index matching fluid 141 is retained between the windows 128 and 130.

The phase shifter 90 includes a mounting structure 144 to which a window 146 is fixedly mounted. A window 148 is positioned adjacent to the window 146 and is attached to a mounting ring 155 which has first ends of transducers such as four piezoelectric cylinders 150, 152 and 154 attached thereto. The fourth piezoelectric cylinder is not shown but has a position similar to that shown in FIG. 8. The second ends of the four piezoelectric cylinders including cylinders 150, 152 and 154 are attached to the mounting structure 144 to be controlled so that a surface 160 of the window 148 is movable a distance $\Delta_4$ to the position of a dotted line 162 one or more times during a recording period, for example. An index matching fluid 163 is retained between the windows 146 and 148. Although piezoelectric cylinders have been shown in the system illustrated in FIG. 7, other suitable movement controlling devices may be utilized within the scope of the invention such as piezoelectric stacks, motor driven micrometers, thermal means, manual operation or electromagnetic transducers.

In order to provide two primary recording beams to the recording medium 100, a laser 166 provides a beam to a beam splitter 168 with the reflected beam passing to a mirror 170 and in turn to a suitable beam shaping structure such as a spatial filter 172. Limiting rays such as A and B are defined by the mounting structure. Rays inside the limit rays are passed through the phase shifter 88 to the window 96, the substrate 98, the recording medium 100 and to an outer surface 101 of the cover plate 94 where first order reflections of the rays from the spatial filter 172 occur as explained relative to FIG. 3. The laser beam transmitted through the beam splitter 168 is reflected from a mirror 176 through suitable beam shaping optics such as a spatial filter 178 to an object 180 to be recorded. Rays of a diffused beam indicated as a ray B are reflected from the surface of the object 180 and passed through the window 160 of the phase shifter 90, the cover plate 94, the recording medium 100 to a surface 123 of the cover plate 121 where first order reflections occur. It is to be noted that the invention is not limited to operation at any particular wavelength of light but includes operation at any suitable wavelength.

For controlling the movement of the recording structure 86 and the phase shifter 90, a waveform generator 184 applies, for example, a ramp voltage of a waveform 185 through a high voltage amplifier 186 and a lead 188 to the four piezoelectric cylinders including cylinders 104, 106 and 108, to the four piezoelectric cylinders including cylinders 116, 118 and 120 of the recording structure 86 and to the four piezoelectric cylinders including cylinders 150, 152 and 154 of the phase shifter 90. Each of the piezoelectric cylinders is coupled to a source of reference potential (not shown) as is well known in the art.

The phase shifter 88 is slaved to the phase shifter 90 by a mixing arrangement including a beam splitter 192 attached at a selected position around the substrate 98 and which receives a ray $A_1$ from the phase shifter 88 and a ray $B_1$ from a ray being reflected from a mirror 194 through the phase shifter 90. The mirror 194 is a small mirror mounted at a position on or near the object 190 so that undiffused rays can be applied to the beam splitter 192. Mirrors 196 and 198 are mounted to the structure 92 to respectively reflect a transmitted beam $A_1$ and a reflected beam $B_1'$ and to reflect a reflected beam $A_1'$ and a transmitted beam $B_1$ through respective windows 200 and 202 to respective detectors 204 and 206. The signals provided by the detectors 204 and 206 are applied to a differential amplifier 208 for providing a control signal. The beam splitter forms a Michelson interferometer that compares the phases of transmitted beam $A_1$ with reflected beam $B_1'$ at the detector 206 and compares the phases of transmitted beam $B_1$ with reflected beam $A_1'$ at the detector 204. By comparing the output signals of the detectors 204 and 206 in the differential amplifier 208, an electrical signal is generated that is proportional to the difference in phase of laser beams $A_1$ and $B_1$ in the plane of the substrate 98. The use of two detectors makes the null points independent of absolute laser power. The control signal provided by the differential amplifier 208 is applied through a lead 210, through a high gain voltage amplifier 212 and through a lead 214 to the four piezoelectric cylinders of the phase shifter 88 including the cylinders 132, 134 and 136. Each of the piezoelectric cylinders of the phase shifter 88 is also coupled to a source of reference potential (not shown). Thus, the voltage on the lead 214 closely follows the phase change provided by the phase shifter 90 so that the primary beams are maintained at a fixed phase as the windows 130 and 148 move. By slaving the phase shifter movement to the movement of the phase shifter 90, any variation of ramp signal or piezoelectric cylinder characteristics does not effect the phase of the primary beams.

Figure 9:
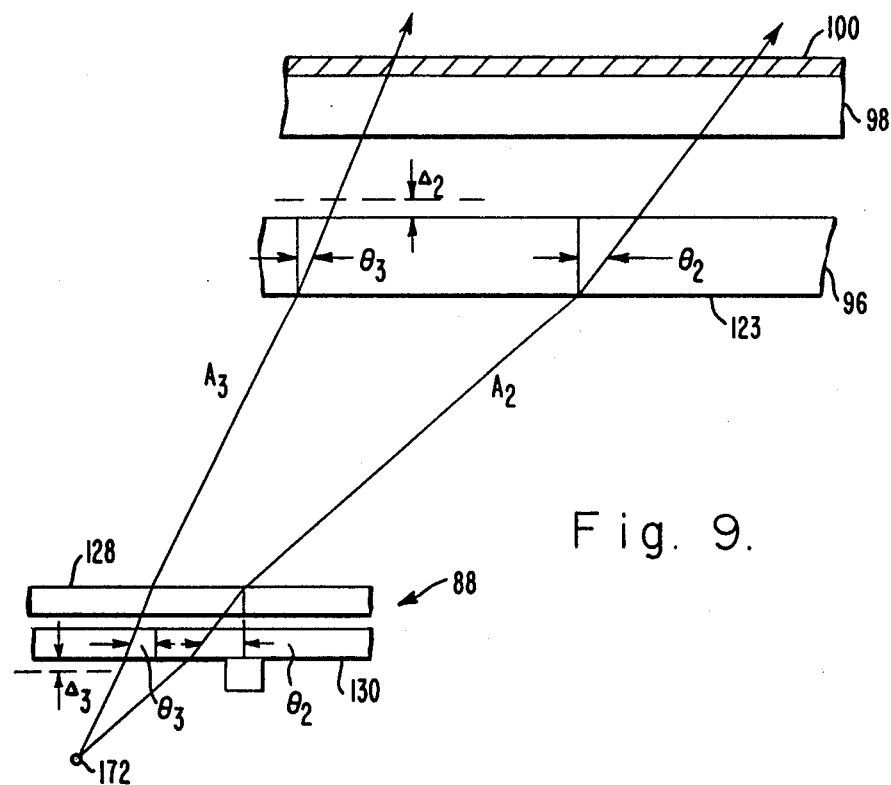
FIG. 9 is a schematic fragmentary side view of the global phase shifter operating with a reflecting surface of the recording stucture for further explaining the operation of the global phase shifter in accordance with the principles of the invention.

To further explain the correspondence of angles of each ray between the phase shifter unit and the cover plate reference is now also made to FIG. 9 which is a fragmentary side view of a portion of the global phase shifter 88 and a portion of the recording structure 86 inverted for convenience of explanation. In order to lock the phases of the primary exposure beams in the system of FIG. 7, a compensation must be provided for the global variation in path lengths in the entire wavefront which occurs as a result of the variations in path angle through the moving cover plates. The rays $A_2$ and $A_3$ are applied to the flat cover plate 96 and in turn through the substrate 98 and the recording medium 100. The two rays $A_2$ and $A_3$ pass through the surface 123 of the moving cover plate 96 at different angles $\theta_2$ and $\theta_3$. It is to be noted that by moving the cover plate 96 a distance $\Delta_2$, the path length change for each beam is different since it depends inversely on the cosine of $\theta$. Thus, in order to maintain the phases of the main exposure beams locked, the phase shifter 88 must correct the phases of each ray in the inverse ratio of the cosine of $\theta$. The phase shifter is a liquid index matched structure with a surface and refractive index that substantially matches the cover plate 96. Thus, the angles through the phase shifter 88 correspond to the angles for each ray passing through the cover plate 96. The phase shifter 88 automatically adjusts each ray in proportion to its own inverse cosine function so that the path length compensation over all of the surface of the cover plate 123 is of the proper amount. Thus, a requirement for designing the phase shifter of FIG. 7 is that the angles such as $\theta_2$ for each single ray must be the same as at the cover plate 96. Accordingly, the global phase shifters in accordance with the invention corrects the phase of each of the main beams so that each ray is at a constant phase and so that the two beams maintain their relative phase relationship while the moving cover plate such as 96 changes the phase of the reflected beams relative to the main primary beams to prevent formation of spurious hologram recordings.

Referring now back to FIG. 7, it is to be noted that the cover plates 94 and 96 move inward or in opposite directions relative to the recording medium 100 while the phase shifter windows 148 and 130 move outward so that the phase shifter surfaces are both moving inward or outward while the cover plates respectively move outward or inward. Thus the relative phases of the primary beams are maintained constant. At the same time, the phases of the rays reflected from the surfaces 123 and 101 are continually changing in phase relative to the phase of the primary beams and this continual phase change includes all first and higher order reflection rays. Thus as discussed relative to FIG. 3, spurious holograms are prevented from being formed from reflected rays as the continual phase change relative to the primary beams and relative to each other provides only a darkening or hardening of the developed hologram. As discussed relative to FIG. 5, in a phase type recording material only the modulation index is slightly decreased and in an amplitude recording material, only a slight darkening of the developed hologram is provided in the systems of the invention.

To consider the amount of phase shift that is provided, select $\Delta_1 = \Delta_4$ and $\Delta_2 = \Delta_3$. Considering only the phase shifter 90, $\Delta_4$ is selected to be equal to $\Delta_1$. When the materials in the global phase shifter 90 and the recording structure 86 all have the same index of refraction n, then $\Delta_4 = \Delta_1 = \Delta_2$. When there is a difference in index of materials between the global phase shifter 90 and the recording structure 86 then $$\frac{\Delta_4}{\Delta_1} = \frac{n \text{ recording structure}}{n \text{ global phase shifter}}$$

The phase shift of the phase shifter 90 is then $\pm(n-1)\Delta_4$ and the phase shift of the reflected ray at the surface 123 is $2(n)\Delta_2$. The phase shift of the transmitted beam at surface 123 is $\mp(n-1)\Delta_1$. If the index of refraction n is at 1.515, the phase shift of the reflected rays is $3\Delta_1$, not considering the cosine of the angle of incidence.

Also the concepts of the invention, as illustrated in FIG. 7, include using, to prevent the effect of spurious recordings and noise, step type such as double exposure systems where the cover plates are moved a distance causing a phase shift of $\lambda/2$ at the recording medium. In a double exposure system, this step is in the middle of the exposure period so that the undesired recordings are cancelled by the exposure of reflection rays being 180° out of phase from each other. In this type of system, the phase shifters are controlled at the $\lambda/2$ step change so as to maintain the primary beams at a constant relative phase for the primary recording. For this type system, the waveform generators 78 and 184 of respective FIGS. 5 and 7 are appropriately modified. Multiple exposure type recording is generally limited to relatively simple recording systems.

Figure 10:
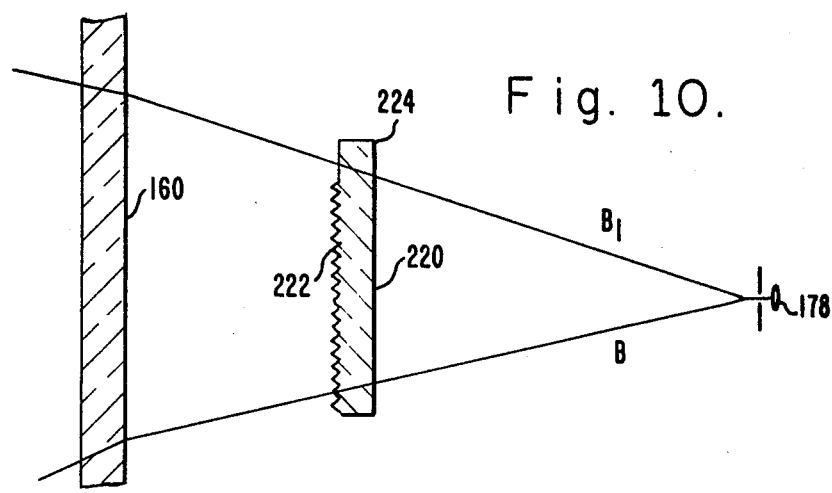
FIG. 10 is a schematic sectional view showing a portion of the system of FIG. 7 with a primary ray applied through a diffusion plate for explaining the formation of a diffusion hologram such as may be utilized for a display screen.

Referring now also to FIG. 10, an arrangement is shown for forming a diffusion hologram that, for example, may be used as a projection display screen. The spatial filter 178 is moved so that it passes the primary beam through a diffusion screen 220 having an irregular surface 222 so that rays are directed after passing through the phase shifter 88 to all of the surface of the recording medium 100 from each small area of the screen 220. A smooth glass 224 is provided at a selected position on the diffusion screen 220 so that rays such as the ray B, will pass through the phase shifter 88 and directly to the beam splitter 192.

The concepts of the invention are not limited to systems using piezoelectric cylinders but may utilize any other suitable transducer or movable means such as piezoelectric stacks, motor driven micrometers or electromagnetic transducers and is not limited to any particular type of recording medium. Also the ramp generator may be a generator to provide a triangular or any other waveform in some arrangements in accordance with the invention to provide the same phase shift. Further, the invention as shown in FIG. 7 is not limited to using an interferometer with one phase shifter slaved to the other but includes arrangements where both phase shifters are controlled by the ramp voltage or other suitable shaped waveforms. Also, the invention as illustrated in FIG. 7 includes within its scope, variations where the cover plates and corresponding phase shifter moves at a different rate than the other cover plate and phase shifter. The concepts of the invention are applicable to systems using glass structures or any other material transparent at the wavelengths of the recording beams.

The principles of the invention are not limited to any particular wavelength and are applicable to beams or wavefronts from lasers as well as all electromagnetic radiation emitters and acoustic emitters. Also within the scope of the invention, rays A and B can be from beams resulting from non-divergent, divergent or collimated sources. The format of the holograms in accordance with the invention can be generated by a single overall exposure, a series of adjacent exposures or a series of overlapping exposures, or any combination thereof.

It is to be noted that although the recording medium has been illustrated as having round edge configurations, the principles of the invention are equally applicable to recording mediums and structures having any desired edge configurations. Further, the principles of the invention are not limited to using flat covers but may use any desired configuration such as spherical.

It is to be noted that although the systems of the invention are illustrated with four piezoelectric cylinders in each transducer group, and desired number such as three may be utilized.

Thus, there has been described systems for forming diffusion type holograms in which spurious hologram recordings are eliminated. By movement of at least one cover plate the reflecting surface or surfaces that provide reflection rays are changed in phase relative to the primary beam and the diffusion beam during the recording period. Thus the undesired reflected beams do not have a constant phase relationship with the primary beams so that spurius holograms can be formed.

What is claimed is:

1. A system for recording, from first and second beams, a diffusion type hologram, said system comprising: a recording structure including a recording medium positioned between first and second plates which are transparent to beams diffused from an object to which said first beam is applied and transparent to said second beam, and including an index matching fluid retained between said first and second plates;
   - transducer means coupled to at least one plate for moving said plate; and
   - control means coupled to said transducer means for controlling said transducer means to move said plate coupled thereto during a recording period to inhibit formation of spurious hologram recordings.

2. The combination of claim 1 in which said first plate is a cover plate fixedly attached to recording structure mounting means, said second plate is a cover plate fixedly mounted to said transducer means, and wherein said control means applies a control signal to said transducer means.

3. The combination of claim 2 in which said transducer means includes a plurality of piezoelectric structures.

4. The combination of claim 3 in which said control means includes a waveform generator and said control signal is a voltage varying at least over said recording period.

5. The combination of claim 1 in which said recording medium is positioned on a substrate fixedly mounted to said recording structure mounting means, said first and second plates are cover plates and said transducer means includes first transducer means mounted between said recording structure mounting means and said first cover plate and second transducer means mounted between said recording structure mounting means and said second cover plate, wherein said first beam is applied from a first source to said first cover plate and said second beam is applied from a second source to said second cover plate, and wherein there is further provided first phase shifter means positioned between said first source and said first cover plate and second phase shifter means positioned between said second source and said second cover plate.

6. The combination of claim 5 in which said control means controls said first and second transducer means so that said first and second cover plates move in opposite directions, said first and second phase shifter means each including first and second windows and each respectively including third and fourth transducer means for moving the first windows of said respective first and second phase shifter means, said control means further including means controlling said third and fourth transducer means to move said first and second phase shifter means in opposite directions.

7. The combination of claim 6 in which said first and second phase shifter means each further includes phase shifter mounting means, wherein the second windows of said first and second phase shifter means are fixedly mounted to said phase shifter mounting means, wherein said first windows of said first and second phase shifter means are fixedly mounted to said respective third and fourth transducer means, and wherein said third and fourth transducer means are fixedly mounted to the phase shifter mounting means of the corresponding phase shifter means.

8. The combination of claim 7 in which said first, second, third and fourth transducer means each respectively include a first, second, third and fourth plurality of piezoelectric structures.

9. The combination of claim 8 in which said means for controlling said third and fourth transducer means comprises a source of a control signal coupled to said third plurality of piezoelectric structures, and interferometer means coupled to said fourth plurality of piezoelectric structures, said interferometer means including beam splitter means positioned at said recording medium for responding to said first and second beams respectively passing through said first and second phase shifter means to provide phase correction signals, said interferometer means controlling the movement of said fourth plurality of piezoelectric structures in response to the movement of the first window of said first phase shifter means.

10. A system for recording a diffused hologram from a source of first and second beams, said system comprising a recording structure including a recording medium and index matching fluid positioned between first and second cover plates transparent to the beams, said first and second beams being applied to said recording structure, said system further comprising:
   - a diffusion element coupled between said source of a first beam and said first cover plate;
   - transducer means coupled to said first and second cover plates for moving said cover plates;
   - control means coupled to said transducer means for controlling said transducer means so as to move said cover plates coupled thereto during a recording period to inhibit formation of spurious hologram recordings;
   - first phase shifter means coupled to said control means and positioned between said diffusion plate and said first cover plate; and
   - second phase shifter means coupled between said source of a second beam and said second cover plate.

11. A system for recording a hologram comprising a recording structure including a recording medium and a transparent plate, first and second beams applied to said recording structure, and means for changing the phase of rays reflected from said plate relative to phase of rays in said first and second beams.

12. The combination of claim 11 wherein said changing means comprises means for moving said recording structure during a recording period.

13. The combination of claim 12 wherein said moving means comprises means for relatively moving elements of said recording structure.

14. The combination of claim 12 wherein said moving means comprises means for moving said plate relative to said recording medium.